United States Patent [19]

Szatmári

[11] Patent Number: 5,303,254
[45] Date of Patent: Apr. 12, 1994

[54] TRANSVERSELY DISCHARGE-PUMPED GAS LASER

[75] Inventor: Sándor Szatmári, Goettingen, Fed. Rep. of Germany

[73] Assignee: Max-Planck-Gesellschaft zur Foerderung der Wissenschafen e.V., Goettingen, Fed. Rep. of Germany

[21] Appl. No.: 867,121

[22] Filed: Apr. 10, 1992

[30] Foreign Application Priority Data

Apr. 15, 1991 [DE] Fed. Rep. of Germany ........ 4112311

[51] Int. Cl.$^5$ .............................................. H01S 3/097
[52] U.S. Cl. ........................................ 372/87; 372/83; 372/93; 372/107
[58] Field of Search ............... 372/87, 93, 92, 83, 372/107

[56] References Cited

U.S. PATENT DOCUMENTS

| 3,895,313 | 7/1975 | Seitz ............................ 331/95.5 D |
| 4,872,179 | 10/1989 | Nitsche et al. .................... 372/93 |
| 4,939,738 | 7/1990 | Opower ............................ 372/93 |
| 5,008,896 | 4/1991 | Martinen et al. .................. 372/87 |
| 5,042,047 | 8/1991 | Ono et al. ........................ 372/93 |

FOREIGN PATENT DOCUMENTS 2444456 of 1975 Fed. Rep. of Germany.
2-16783 of 1990 Japan.

OTHER PUBLICATIONS

Optics Communications, vol. 15, No. 1, Sep. 1975, P. E. Dyer, et al. pp. 20-25; Studies of a TEA $CO_2$ Laser with a Cylindrical Mirror Unstable Resonator.
Japanese Journal of Applied Physics vol. 29, No. 1, Jan. 1990, pp. 95–100, Nakamura, et al.; Improvement of a Corona-Preionized TEA-$CO_2$ Laser by Means of High-Frequency Corona Discharge.
Optics Communications 88 (Mar. 1992) pp. 231–239, North-Holland, Almasi, et al. Optimized Operation of Short-Pulse KrF Amplifiers by Off-Axis Amplification.

Primary Examiner—Léon Scott, Jr.
Attorney, Agent, or Firm—Nields & Lemack

[57] ABSTRACT

A transversely discharge-pumped gas laser has a discharge vessel, which encloses a laser gas and at least one pair of oppositely disposed elongated discharge electrodes which extend in a predetermined longitudinal direction and are separated by a discharge region, in which laser radiation is generated which propagates along a beam path. The beam path passes once or a plurality of times through the discharge region. The direction of the beam path of the sole pass or some or all of the multiple passes forms an angle different from zero with the longitudinal direction of the elctrodes. The angle or angles are chosen such that the quality, homogeneity of intensity profile, gain and output energy of a resulting output beam are well balanced.

2 Claims, 8 Drawing Sheets

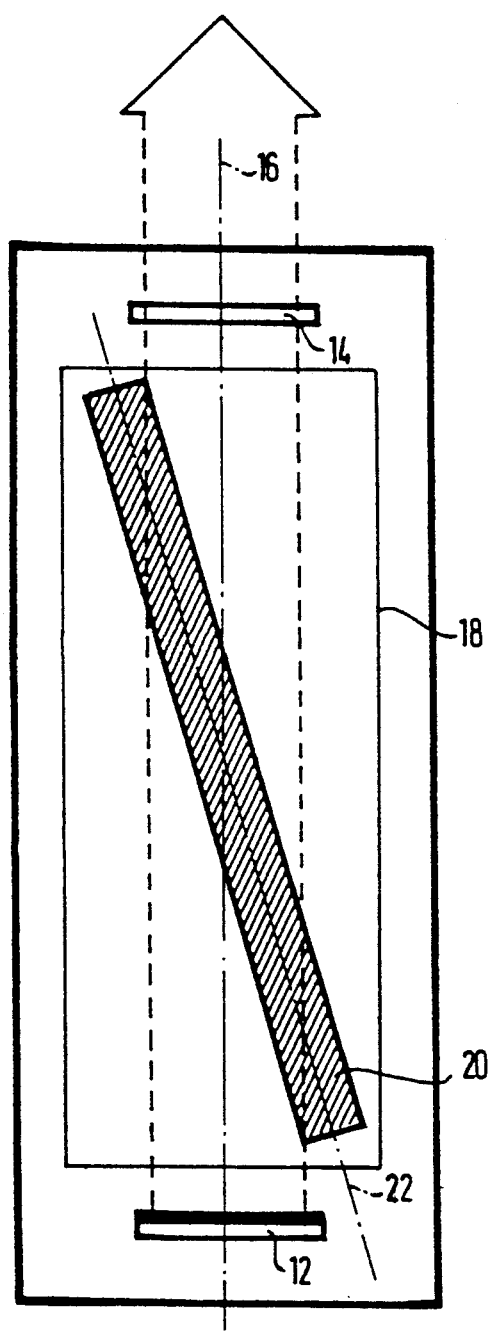

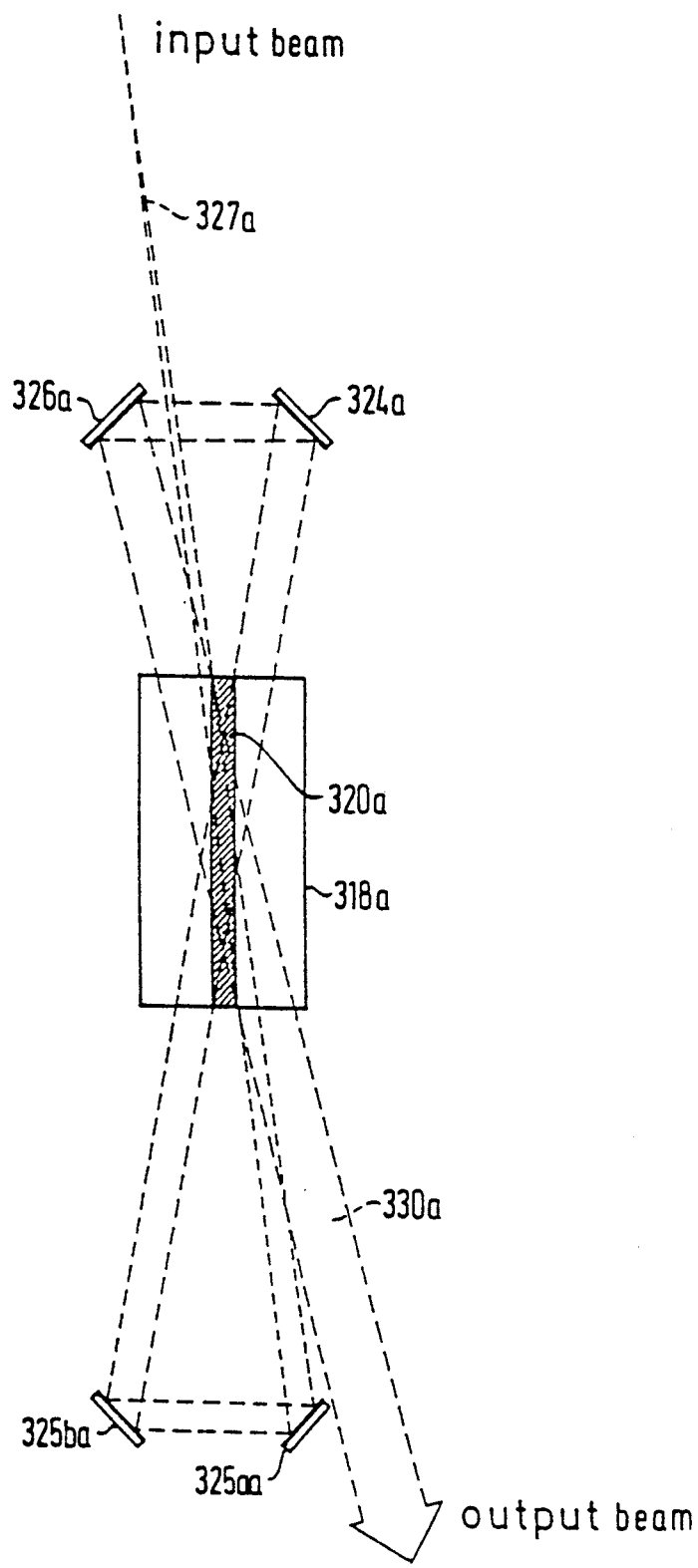

TRANSVERSELY DISCHARGE-PUMPED GAS LASER

FIELD OF THE INVENTION

The present invention relates to a gas laser, in particular an electrically transversely discharge-pumped gas laser with an off-axis beam path, in which beam quality beam cross-section, gain and output energy are simultaneously optimized.

BACKGROUND OF THE INVENTION

Discharge-pumped excimer lasers are the most important high-power lasers for the ultraviolet spectral range. A conventional discharge-pumped excimer laser includes a laser head having a discharge vessel (laser chamber) which is filled with a suitable gas mixture (laser gas) and contains two elongated electrodes which may have a length of a few ten cm to 1 m, extend parallel to each other and are disposed opposite each other spaced apart a few centimetres. In operation these electrodes are subjected in pulse-like manner to an electrical voltage of a few 10 kV and a rise time of typically 10 to 100 ns in order to generate as homogeneous a discharge as possible between the electrodes. To achieve this, it is also necessary for the discharge space between the electrodes to be irradiated with shortwave ultraviolet light simultaneously, for example by a row of small spark gaps, to ensure an adequate preionization of the discharge path since otherwise instead of the homogeneous discharge only series of individual sparks would form. With appropriate configuration of the electrodes the resulting discharge can obtain a width of a few millimetres up to about several centimeters.

Discharge pumped gas lasers with an off-axis beam path and multiple pass of the laser beam through a discharge area of a gas laser, or through another active laser medium are known (OPTICS COMMUNICATIONS, 15, No. 1, Sep. 1975, 20-25; JP 2-16783 A2). The purpose of this is the provide for angular separation for multiple-pass arrangements and/or better utilisation of the volume of the laser medium, and, thus, the off-axis angle (angle between the beam axis and the longitudinal axis of the active laser medium) is small and/or the subsequent passes of the laser beam are directed through different regions of the laser medium.

The limit to the energy extraction of a short-pulse laser amplifier is set by the cross-section of the amplifier. The maximum energy density is limited to $E_{sat} \times g_0/*$, due to the combined effect of saturation of the gain and non-saturable absorption (where $E_{sat}$ is the saturation energy density, $g_0$ and $*$ are the gain and absorption coefficients, respectively). This sets the theoretical limit of the output energy of the laser amplifier. Up to this limit the increase of the output energy is only possible by increasing the saturation, following the conventional amplifications schemes. However when the energy density already surpasses a value which is dependent on the $g_0/*$ ratio, further increase of the energy density can only be achieved with significant deterioration of the extraction efficiency and the ratio of the actual gain to small-signal-gain. This is why the energy achievable by the commercially available UV-preionized laser amplifiers was limited to less than 10 mJ (typically 4 mJ and 8 mJ using single and double pass amplification schemes respectively). In the double pass amplification scheme the ASE (amplified spontaneous emission) background increases significantly and spatial filtering is necessary to reduce ASE coupling between the passes.

Using the conventional amplification schemes the beam shape is determined by the cross-sectional distribution and homogeneity of the discharge, resulting in usually poor homogeneity and small beam size in the direction perpendicular to the electric field. A homogeneously pumped wide-aperture amplifier could be a solution to achieve better homogeneity and higher output energy. Unfortunately construction and operation of such lasers are complicated and costly compared to the commercial narrow discharge lasers. On the other hand, discharge-pumped, especially KrF lasers are more efficient when the electric excitation is fast, necessitating small discharge-loop and therefore small discharge cross-section. It is seen, that from the optical point of view an ideal amplifier has large cross-section and small gain, to avoid saturation effects and to operate around the optimum energy density. However these requirements can hardly be fulfilled with efficient discharge-pumped gain modules, having generally a pencil-like active volume.

SUMMARY OF THE INVENTION

It is therefore an object of the present invention to improve the homogeneity for the beam profile of a transversely discharge-pumped gas laser.

It is a further object of the invention, to optimize simultaneously the beam quality, the beam cross-section, gain and output energy of a transversely electrically pumped gas laser.

The novel amplification scheme according to the invention is capable of solving the earlier mentioned contradictory requirements. With this scheme significant increase of the beam cross-section and the homogeneity is achieved by tilting the input beam by a specific offset-angle with respect to the conventional optical axis of the amplifier in the plane perpendicular to the electric field and other measures, such as maintaining the amplification in the small signal amplification range of tayloring the beam cross-section of subsequent passes e.g. by making the laser beam slightly divergent, in case that the laser beam passes more than once through essentially the same volume of the laser-active discharge region. As a result, amplifiers with a narrow discharge can efficiently be used for short-pulse amplification. Preferred embodiments of the invention provide the highest possible extraction efficiency, contrast and beam homogeneity. With this technique, the energy range achievable with the same contrast is nearly an order of magnitude higher, than with the conventional amplification schemes, using a single commercial excimer amplifier.

BRIEF DESCRIPTION OF THE DRAWINGS

Hereinafter preferred examples of embodiments of the invention will be explained in detail with reference to the drawings, in which:

FIG. 2 is a simplified illustration of a laser oscillator according to one embodiment of the invention;

FIG. 5a is a schematic illustration of a further, most preferred embodiment of a gas laser amplifier according to the invention, and FIGS. 6 to 9 diagrams useful for understanding the principles of the invention.

DESCRIPTION OF THE PREFERRED EMBODIMENTS

Figure 1A:
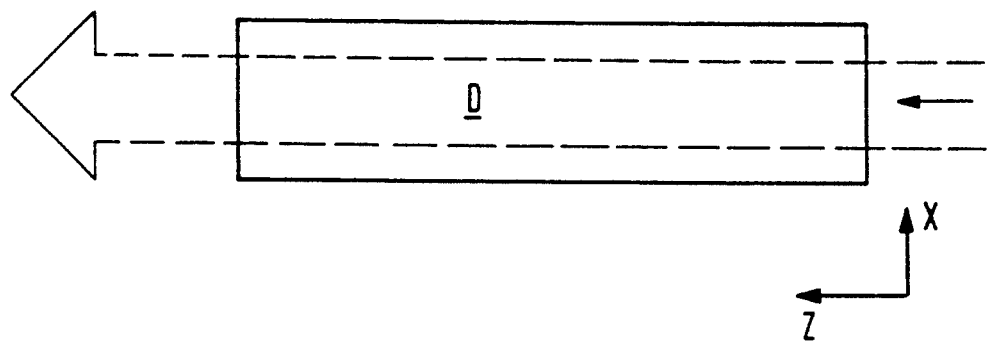
FIG. 1a shows a basic illustration of a known gas laser.
Figure 1B:
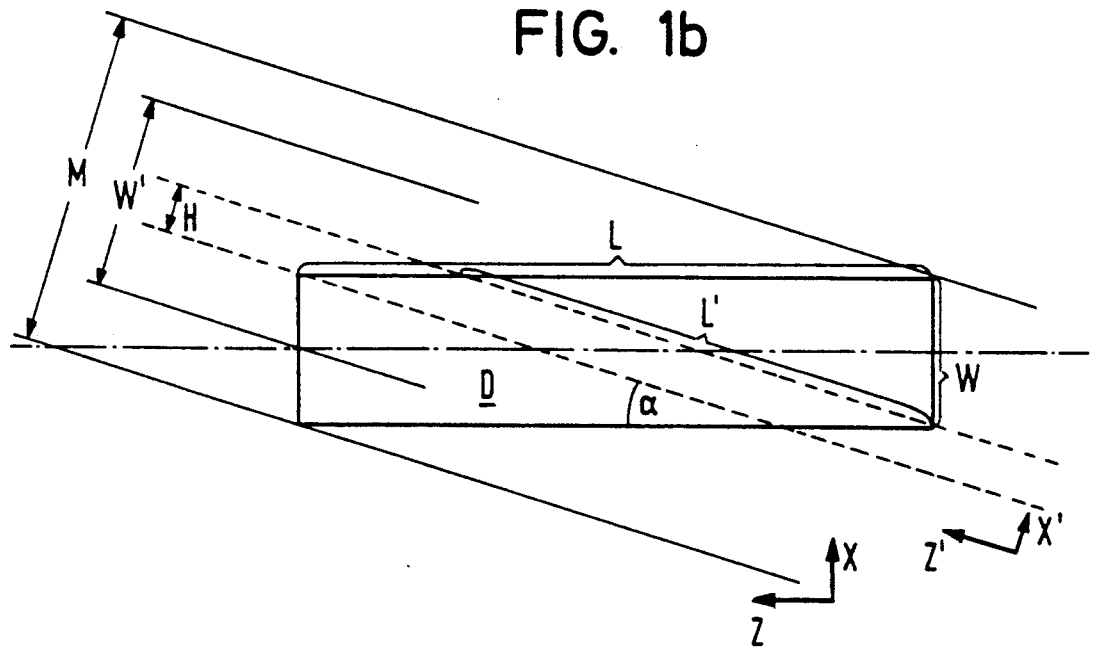
FIG. 1b shows a basic illustration corresponding to FIG. 1a to explain the idea underlying the invention.

The essential feature of the invention resides in that the laser beam path, i.e. the optical axis z, does not extend in the usual manner illustrated in FIG. 1a parallel to the longitudinal direction of the discharge region D in FIG. 1a, or in other words parallel to the longitudinal direction of the discharge electrodes, but at a specific angle $\alpha$ different from zero as shown in FIG. 1b. In a laser amplifier the direction z' of the beam path of the laser beam to be amplified thus extends at the angle $\alpha$ to the longitudinal direction z of the discharge, i.e. the amplifying medium generated by the discharge, i.e. the stimulated laser gas, or of the electrodes.

The present off-axis amplification scheme will be explained with reference to FIGS. 1b, and 6 to 8.

Referring to FIG. 1b, a short-pulse amplifier of given active volume (V) can be characterized geometrically mainly by two quantities: By the useful width (W') seen by the beam which is proportional to the cross-section (A'), and by the length of the amplifier (L'). For a standard on-axis arrangement the cross-section and the length of the amplifier is the same as that of the discharge (L and W).

For the off-axis arrangement L' is obtained by trigonometric transformation of L, as $$L' = \begin{cases} \frac{L}{\cos \alpha} & \text{if } \alpha < \arctan \frac{L}{W}, \\ \frac{W}{\sin \alpha} & \text{otherwise.} \end{cases} \quad (1)$$

Then the useful width of the amplifier is defined as $$W' = \frac{LW}{L'}. \quad (2)$$

Eq. 2 means, that this transformation leaves the active volume and therefore the stored energy of the amplifier unchanged.

Figure 6:
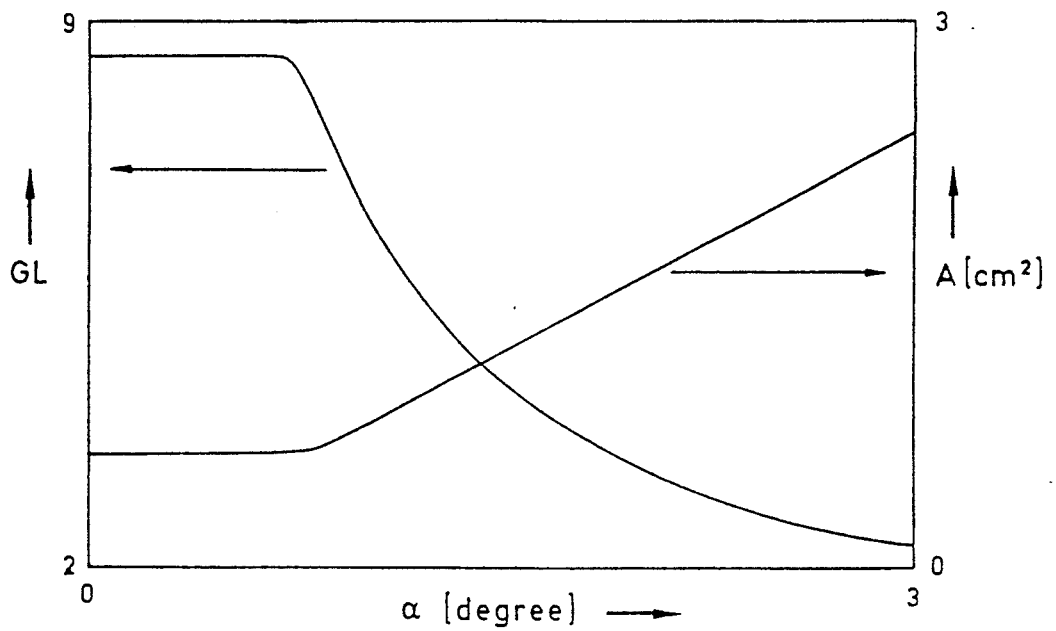

In FIG. 6 the cross-section and the gain-length product GL seen by the short pulse to be amplified is shown as a function of the off-axis angle ($\alpha$) for a specific amplifier. The calculations were performed according to equations (1) and (2) for a known laser amplifier, with L=45 cm, W=0.6 cm and $g_0$=0.19 cm$^{-1}$ (EMG 150 KrF excimer laser, Lambda Physik, Göttingen, Germany). It is seen in FIG. 6 that the cross-section can be increased at the expense of the gain-length product.

From FIG. 1b it is seen that the width of that region where amplification occurs at all is $$M = L \sin \alpha + W \cos \alpha. \quad (3)$$

For large off-axis angles, the input signal sees a homogeneous flat-topped gain distribution, where it is no longer dependent on the transversal gain distribution of the discharge, but determined mainly by the longitudinal gain distribution. In FIG. 1b this region is enclosed by those marginal rays which are shown by dashed lines. The width of this region is given as $$H = \begin{cases} W \cos \alpha - L \sin \alpha & \text{if } \alpha < \arctan \frac{L}{W}, \\ L \sin \alpha - W \cos \alpha & \text{otherwise.} \end{cases} \quad (4)$$

In agreement with experimental observations the longitudinal gain distribution is assumed to be homogeneous, which ensures well characterized gain distribution for the input beam of larger off-axis angles than arctan L/W, even for different transversal gain distributions in the discharge.

To see the consequences of the transformation of the beam size, calculations were carried out using the modified Frantz-Nodvik equations including nonsaturable absorption. The differential equation which describes the energy amplification is given by $$\frac{d\epsilon}{dZ} = g_0 \left( 1 - e^{-\epsilon} - \frac{a}{g_0} \epsilon \right), \quad (5)$$

where $\epsilon$ is the laser energy density normalized to the saturation energy density $E_{sat}$.

The local extraction efficiency can be defined as, $$\eta^{(\epsilon)} = \frac{1}{g_0} \frac{d\epsilon}{dZ}. \quad (6)$$

The local extraction efficiency has a maximal value of $$\eta_{max} = 1 - \frac{a}{g_0} \left( 1 + \ln \frac{g_0}{a} \right) \quad (7)$$

if the energy density in the amplifier is kept around $E_{sat} \times \ln(g_0/a)$. The overall efficiency can be obtained by integrating the local extraction efficiency for the given amplifier length as $$<\eta> = \frac{1}{L} \int_0^L \eta \, dZ \quad (8)$$

The performance of an amplifier can be well characterized by the gain contrast, which is the ratio of the actual gain and the small-signal gain:

$$C = \frac{G}{G_0}. \quad (9)$$

From this parameter one can define a local quantity, what we call the gain contrast coefficient:

$$c = \frac{g_{eff}}{g_0 - a}, \quad (10)$$

where $g_{eff}$ is the effective gain coefficient (which is defined in a similar way to the small-signal gain coefficient, but includes the effect of saturation and absorption)

$$g_{eff}(x) = \lim_{\Delta x \to 0} \frac{1}{x} \ln \frac{E_{x+\Delta x}}{E_x}. \tag{11}$$

The importance of this parameter is especially well pronounced for UV amplifiers, where no saturable absorbers are available, and the only way to keep the ASE level low is to operate the amplifier under certain conditions, where $c \approx 1$.

Figure 7:
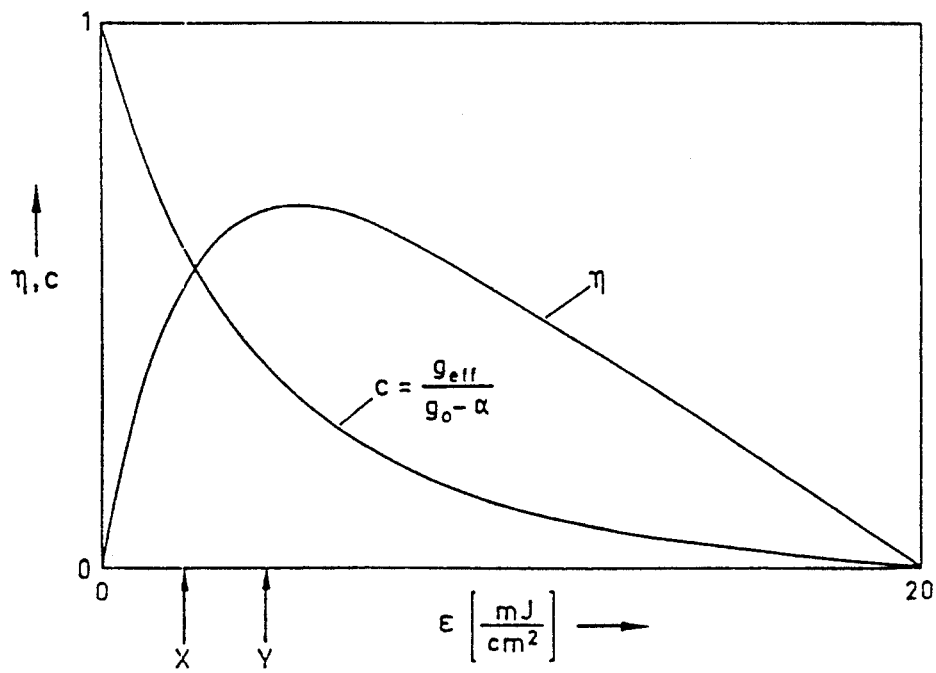

The local extraction efficiency and the gain contrast coefficient are plotted in FIG. 7 for KrF assuming $g/\alpha = 10$. The local extraction efficiency has a maximum and the gain contrast decreases monotonically.

It is readily seen that the maximum efficiency and gain contrast belong to different energy densities. It is seen from these diagrams, that both requirements can never be fulfilled at the same time, one can only have a trade-off, when operating the amplifier close to the saturation energy density. This optimized operation can be best approached by an amplifier having small gain-length product, due to the steep slopes of the curves around the optimum value. It is also seen that for a given amplifier length the input and output energy densities are determined if "optimized" operation is required.

Since in preamplifiers both the optimum extraction efficiency and high gain contrast are of about equal importance, the optimum operational condition for such an amplifier is regarded to be at an energy density, which belongs to the maximum value of the efficiency-gain contrast coefficient product ($\eta \cdot c = \max$). This condition is marked X in FIG. 7, where the energy density is $\epsilon_x \approx 1.1 \cdot E_{sat}$.

In power amplifiers extraction efficiency plays a more important role than gain contrast. Here we set the optimum with an arbitrarily chosen weighting factor $\eta^{10} \cdot c = \max$. This weighting factor results in an operational condition, which coincides with the experimentally found optimum. This condition is fulfilled at an energy density of $\epsilon_y \approx 2.2 \cdot E_{sat}$, marked by Y in FIG. 7.

Figure 8:
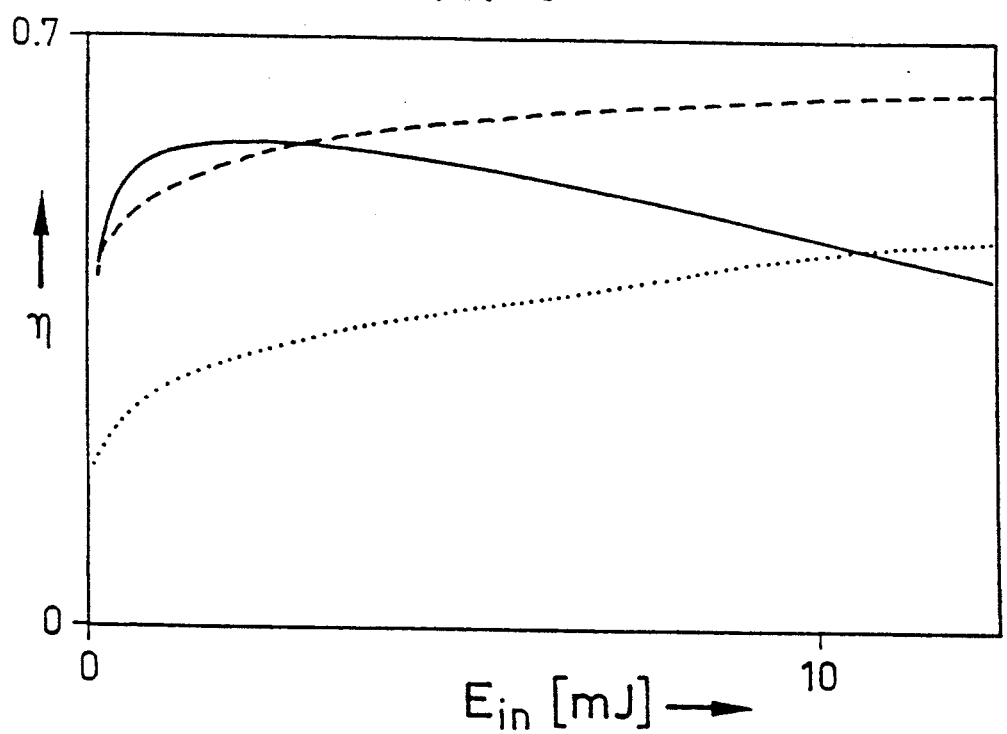

When these optima have been defined, the on-axis and off-axis schemes can be best compared by comparing the performance of an on-axis amplifier, and an optimally chosen off-axis pre- and power amplifier. For this comparison again the data of the mentioned EMG 150 amplifier were taken: L=45 cm, W=0.6 cm, $g_0 = 0.19$ cm$^{-1}$. In FIG. 8 the overal efficiency n and in FIG. 9 the gain contrast c are plotted for this amplifier as a function of the input energy, when operated in the on-axis mode (solid line), and the optimally chosen off-axis preamplifier (dotted line) and final amplifier mode (dashed line). The last two operational conditions correspond to those marked by X and Y in FIG. 7, respectively.

In case of both Figures the given input beam is assumed to fill homogeneously the cross-section of the amplifier, which—in the off-axis mode—is chosen to be in the earlier defined optimum by proper choice of the off-axis angles. It is seen from FIG. 8, that the on-axis and the off-axis power amplifier mode has comparable efficiency, while the off-axis preamplifier shows a somewhat lower efficiency. The maximum efficiency is obtained in the on-axis mode at low input energies ($E_{in} \approx 2$ mJ), while the efficiency curve is monotonically increasing in the off-axis amplifiers for the studied input energy range ($E_{in} \leq 10$ mJ).

Figure 9:
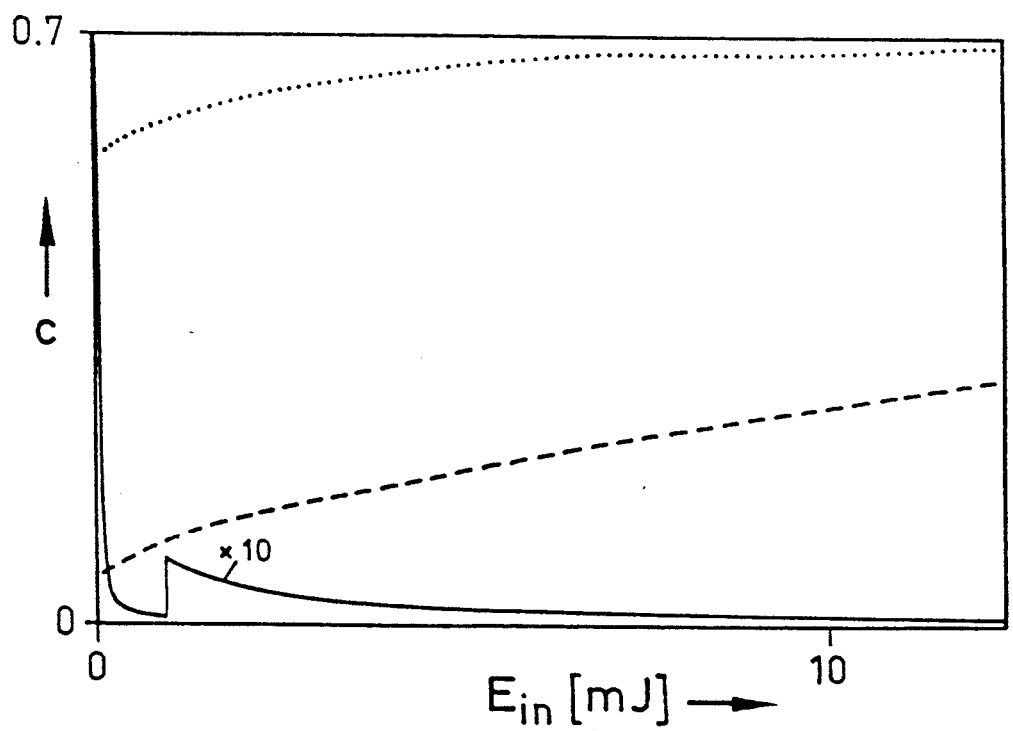

An enormous change in performance of the on-axis and off-axis amplifiers is seen on the gain contrast curves in FIG. 9. The contrast drops below a few percent in the on-axis mode for input energies in the mJ range. However, in case of off-axis preamplifiers it is around 60 to 70% for similar input energies. Even in the case of off-axis power amplifiers—which are optimized mainly for efficiency—the contrast is in the range of 20 to 40%, when amplification of input pulses in the mJ range is needed.

It is worth noting that the theoretically predicted high extraction efficiency of the on-axis scheme (solid line in FIG. 8) is difficult to reach experimentally for two reasons. One is that in this case the output energy density is relatively high (three to five times $E_{sat}$) which corresponds to high intensities for subpicosecond (several GW/cm$^2$), where nonlinear effects in window materials are important. The second is related to the low gain contrast of this scheme, shown by the solid line in FIG. 9. This low gain contrast is related to an extremely high value of the small-signal gain, which often leads to gain depletion by ASE. This decreases the stored energy of the amplifier and therefore the output energy.

The scheme explained above can be implemented in various way as the following preferred but not exhausting examples show.

FIG. 2 shows schematically a laser oscillator comprising an optical resonator which is defined by a mirror 12 which is as completely reflecting as possible and by a semitransparent mirror 14 and the optical axis of which is represented by a dot-dash straigth line 16. Between the mirrors 12, 14 there is an only schematically indicated usual discharge vessel 18 (laser chamber) in which two elongated electrodes lie opposite each other spaced apart a few centimetres, the longitudinal direction of said electrodes being denoted by a dashed straigth line 22. The discharge vessel 18 contains a suitable laser gas, for example a mixture of neon, krypton and fluorine, and furthermore a means is provided for preionizing the laser gas laterally of the electrodes as well as a pulse voltage source. In operation the pulse voltage source supplies to the electrodes electrical pulses having for example a peak voltage of a few ten kV, a rise time of typically 10 to 100 ns and a duration of the order of magnitude of 50 to 100 ns. These means are not illustrated, being of usual type, and it is therefore not necessary to explain them in detail.

According to the present invention the longitudinal direction 22 of the electrodes 20 extends at an angle between 1° and 5° to the optical axis 16 of the optical resonator, i.e. the resulting laser beam.

It will immediately be apparent that the discharge between the electrodes indicated by a hatching in FIG. 2 now offers a larger cross-section to the laser beam. Admittedly, the path travel of the laser beam through the discharge and thus also the amplification is now smaller. However, due to the inclined passage of the laser beam through the discharge the beam is now integrated over the inhomogenities at the edges of the discharge so that in contrast to the known arrangement according to FIG. 1a a substantially more homogeneous distribution of the laser beam is achieved over the beam cross-section which is moreover further enlarged.

Figure 4:
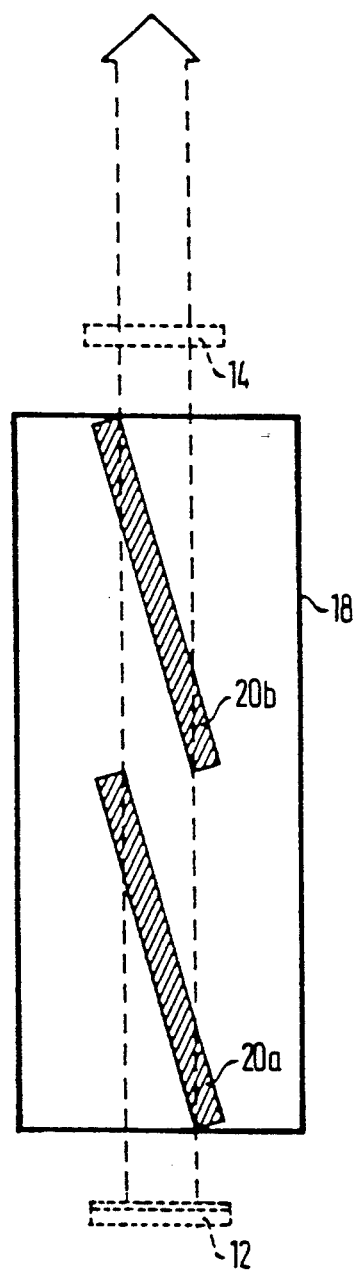
FIG. 4 is a schematic illustration of a further example of embodiment of a gas laser according to the invention and FIG. 5 is a schematic illustration of a further preferred embodiment of a gas laser amplifier according to the invention.

FIG. 4, which employs the same reference numerals as in FIG. 2 for corresponding parts, shows another example of embodiment of a laser oscillator arrangement according to the invention. Instead of a single pair 20 in FIG. 2, in this case in the discharge vessel 18 two pairs 20a, 20b of electrodes are arranged in staggered array, the longitudinal directions of which extend parallel to each other in the manner described inclined to the direction of the laser beam. Of course, three or more pairs of electrodes may also be provided and adjacent electrode pairs can also extend at an angle to each other. The use of a plurality of pairs of shorter electrodes instead of a very long electrode has the advantage that the amplified spontaneous emission which reduces the inversion in the discharge and also forms an undesired background of the laser emission is substantially reduced compared with the conventional arrangements with long electrodes. With such a division of the electrodes into two or more pairs as well, due to the angle between the longitudinal direction of the electrodes and the resonator axis or beam direction the cross-sectional enlargement and substantially improved homogeneity of the beam profile is again obtained. Both arrangements can also be used ass amplifiers.

As an example of the improvements of cross-section size and homogeneity of the amplification which can be achieved, a commercial excimer laser (model EMG 501, Lambda Physik, Göttingen) was filled with a conventional gas mixture for KrF and used as amplifier for an ultrashort laser pulse of 450 fs duration with a wavelength of 248 nm. With conventional configuration in which the beam to be amplified extends along the axis of the discharge, a beam cross-section of $25 \times 5$ mm$^2$, was obtained with a relatively inhomogeneous intensity distribution. If however the beam is allowed to pass through the discharge at an angle of 1.8° to 2.4° to the longitudinal axis of said discharge, the intensity distribution becomes substantially more homogeneous and the beam cross-section increase to $25 \times 22$ mm$^2$, and $25 \times 25$ mm$^2$, respectively. To enable operations to be carried out with these angles of incidence, the usual windows with their mountings were simply removed from the commercial laser and replaced by $90 \times 50 \times 7$ mm$^3$ large MgF$_2$ windows with corresponding mountings. Since the beam cross-section increases up to five times due to the inclined beam path according to the invention compared with the normal configuration, with corresponding intensity of the input beam it is also possible increase the output power of the amplified beam by up to five times, said power being proportional to the amplification cross-section with the short pulse lengths employed, as generally known.

Figure 3:
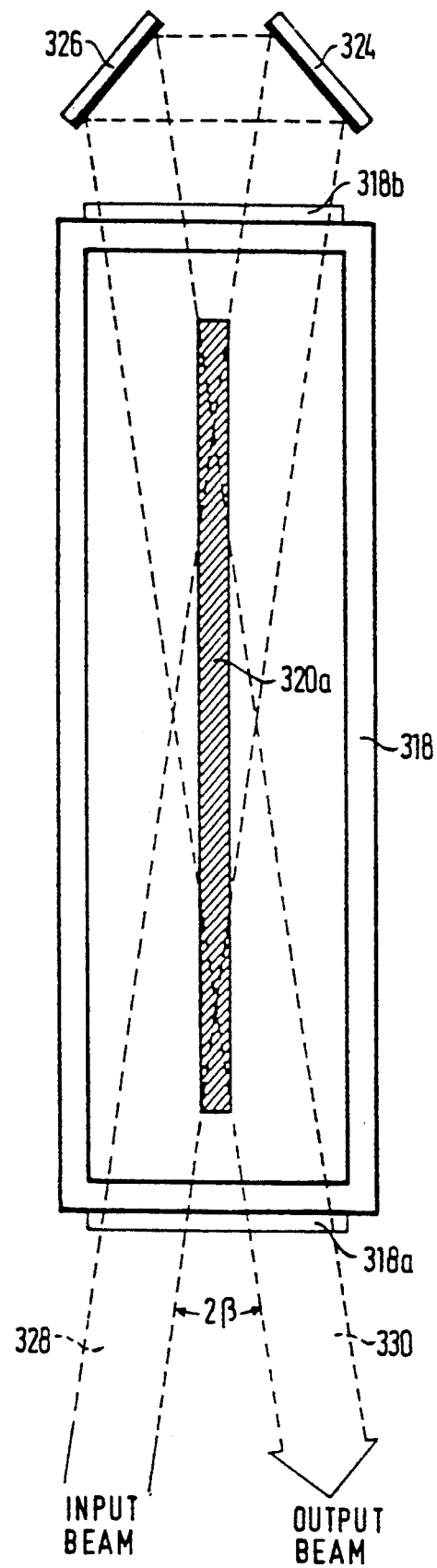
FIG. 3 is a schematic illustration of a laser amplifier according to a preferred embodiment of the invention.

As illustrated in FIG. 3, the reduction of the path length through the discharge due to the inclined passage of the laser beam can easily be compensated if an X configuration with double passage through the discharge is employed. The laser amplifier of which the parts essential to the invention are shown in FIG. 3 includes a discharge vessel 318 which is provided at its end sides with MgF$_2$ windows 318a, 318b. In the interior of the discharge vessel 318 there is a laser gas, for example a mixture of neon, krypton and fluorine, and a pair of oppositely disposed elongated strip-like electrodes which enclose a discharge region 320a shown hatched. At one end of the discharge vessel 318 two beam deflection mirrors 324, 326 are arranged which cause an input laser beam 328 to be amplified and passing at an angle $\beta$ through the discharge region 320a to be sent back again through the discharge region 320 in the reverse direction in lateral symmetry with respect to the input beam 328 so that the output beam 330 has passed twice inclined through the discharge region 320. As a result, apart from the cross-section enlargement a particularly extensive integration is achieved over the homogeneities at the edges of the discharge.

In contrast to the known multipass schemes, where each pass of the laser beam is directed to a different portion of the volume of the active laser medium, the present invention strives to cover the same volume, which should be as large as possible, of the active laser medium by each of the subsequent passes of the laser beam.

Figure 5:
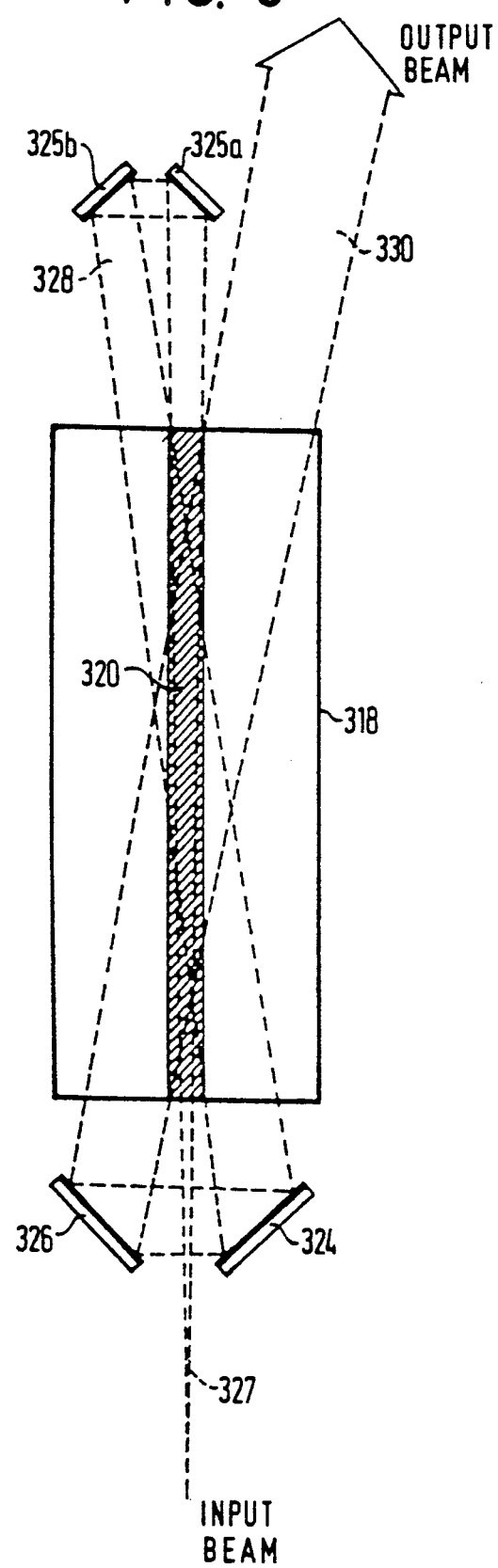

As further example of embodiment of the invention FIG. 5 shows an excimer laser amplifier with a triple beam passage through the discharge region. The laser amplifier according to FIG. 5 corresponds in part to the example of embodiment according to FIG. 3 so that the same reference numerals have been used for corresponding parts.

In the first passage the excimer laser is employed as preamplifier in conventional manner to obtain a high amplification with a small beam cross-section. The input beam 327 is preferably widened if it does not already have adequate divergence, as is indicated in FIG. 5, and is led through the discharge 320 parallel to the longitudinal direction thereof. The preamplified beam is then deflected by a pair of deflection mirrors 325a, 325b in such a manner that the deflected beam 328 passes inclined through the discharge region 320 in a second passage. The beam is then again deflected by the deflecting mirrors 324, 326 and then passes again in the opposite direction through the discharge region 320 so that finally an output beam 330 is obtained which has a correspondingly high output power, large cross-section and high homogeneity.

FIG. 5a shows a modified at present most preferred version of FIG. 5. The embodiment of FIG. 5a is in many aspects similar to that of FIG. 5, thus the same reference numerals, with an a added are used.

For implementing the laser amplifier of FIG. 5a the KrF amplifier tube of an EMG 150 laser was modified as follows: The original window mounts were replaced by new parts which enabled the use rectangular MgF$_2$ windows of $8 \times 3$ cm$^2$ free area. All the other parts of the laser head were unchanged. The two windows were tilted by 5 degrees with respect to the conventional optical axis to avoid unwanted oscillations. The amplifier tube was filled with a partial pressure of 6 mbar of F$_2$, 150 mbar of Kr and with He as buffer gas to a total pressure of 2.6 bar.

The input beam 327a to the laser amplifier of FIG. 5a was generated by a femtosecond dye laser system and was made divergent (with a half angle of 0.2°) by a $f=-300$ mm spherical lens. By proper choice of the divergence angle and the delays between the passes, the energy density of the beam was kept close to optimum for all the passes.

The only difference of this scheme compared to FIG. 5 is the first pass. In FIG. 5a already the first amplification pass is in the off-axis mode. The input energy for the first is 12 $\mu$J, the diameter of beam 327a at the entrance of the active volume 320a is a few millimeters. The applied off-axis angle is 1.4°. The energy is boosted up to 0.6 mJ. The circular output beam has a diameter of 10 mm. This corresponds to an output energy density of 0.76 mJ/cm$^2$. After a 140 cm long delay path, this beam serves as an input beam 328a for the second pass where it already fills $14 \times 22$ mm$^2$, cross-section of the amplifier given by the 2.4° off-axis angle applied there. This relatively long delay is necessary to match the beam size of the slightly divergent beam to the different cross-sections in the two amplification passes. The output energy after the second pass is increased to 5.9 mJ which corresponds to an energy density of mJ/cm$^2$. After a 70 cm long delay, the beam enters again the gain volume at an angle of 2.6° for the third pass. The delay between the second and third pass is chosen to be the minimum, necessary for the separation of the beams of the first and third passes. The output energy of the beam 330a after the third amplification pass is 20 mJ in an almost square beam of 20 mm width and 22 mm height. The intensity distribution of the output beam 330a is essentially flat-topped.

The energy contrast ratio was found to be 1:10$^6$, which corresponds to an intensity contrast better than 1:10$^{10}$.

Even with weak saturation of the amplifier the achievable highest output energy for the off-axis scheme is nearly three times higher than that for the conventional double-pass on-axis amplification scheme, having strong saturation. The ASE contrast ratio is nearly three orders of magnitude better for the off-axis scheme in this case.

The achievable gain with the off-axis scheme is more than one order to magnitude higher if the same ASE contrast ratio is required, compared to the on-axis scheme.

Due to the low value of the gain of the off-axis mode, no special measures (like spatial filtering) are needed to avoid gain-depletion by ASE, even when using multiple-pass arrangements.

Since in the off-axis amplification scheme one can avoid the limitations on the cross-section, the operational conditions can be chosen to be optimum for both efficiency and gain contrast for each amplification pass (FIG. 7).

The invention is not restricted to excimer lasers but can be applied in corresponding manner to all similarly discharge-pumped gas lasers, for instance a nitrogen gas laser, to name only one example. It may be expedient to enlarge the beam prior to the inclined passage through the elongated discharge zone at least transversely to the discharge direction so that the entire length of the discharge zone is illuminated by the beam.

The different (increasing) beam cross sections for the subsequent amplification passes can also be realized by a parallel beam and suitable (spherical or cylindrical) telescopes between the amplification passes.

I claim:

1. A transversely discharge-pumped gas laser comprising
   a) a discharge vessel (18),
   b) a laser gas in the discharge vessel,
   c) at least one pair of oppositely disposed elongated discharge electrodes (20) in the discharge vessel which extend in a predetermined longitudinal direction and are separated by an elongated discharge region having a longitudinal center plane extending in spaced relationship between said electrodes, the electrodes of said pair being symmetrical with respect to said longitudinal center plane, in which discharge region the laser gas is stimulable by the discharge to form an active laser medium in the discharge region, and
   d) means for directing laser radiation along a beam path leading in a predetermined direction (16) through the discharge region, and
   e) means to cause said laser radiation to traverse said active laser medium only once such that the longitudinal direction of said elongated discharge region forms an angle in said longitudinal center plane differing from zero with the direction (16) of the beam path, said angle being chosen such that an output beam having an energy distribution of improved homogeneity across the output beam results.

2. A transversely discharge-pumped gas laser comprising
   a) a discharge vessel (18),
   b) a laser gas in the discharge vessel,
   c) at least one pair of oppositely disposed elongated discharge electrodes (20) in the discharge vessel which extend in a predetermined longitudinal direction and are separated by an elongated discharge region having a longitudinal center plane which extends in spaced relationship between said electrodes, the electrodes of said pair being symmetrical with respect to said longitudinal center plane, in which discharge region the laser gas is stimulable by the discharge to form an active, stimulated laser medium in the discharge region,
   d) means for directing laser radiation through the discharge region in at least two passes, and
   wherein the direction of the laser beam of at least one pass forms an angle in said longitudinal center plane differing from zero with the longitudinal direction of the electrodes, said angle being chosen such that an output beam having an energy distribution of improved homogeneity across the output beam results.

* * * * *